United States Patent [19]

Park

[11] Patent Number: 5,523,896
[45] Date of Patent: Jun. 4, 1996

[54] VARIABLE SPEED REPRODUCING APPARATUS FOR A DIGITAL VIDEO CASSETTE RECORDER

[75] Inventor: See-hun Park, Seoul, Rep. of Korea

[73] Assignee: Samsung Electronics Co., Ltd., Kyungki-do, Rep. of Korea

[21] Appl. No.: 366,902

[22] Filed: Dec. 30, 1994

[30] Foreign Application Priority Data

Dec. 30, 1993 [KR] Rep. of Korea ............... 93-31601

[51] Int. Cl.⁶ ..................... H04N 5/78; H04N 5/76
[52] U.S. Cl. ............ 360/10.300; 360/27; 360/51; 360/65; 358/335
[58] Field of Search .................. 360/10.1, 10.3, 360/46, 51, 65, 67, 27; 358/312, 335

[56] References Cited

U.S. PATENT DOCUMENTS

| | | | |
|---|---|---|---|
| 4,930,024 | 5/1990 | Kanda et al. | 360/10.1 |
| 5,247,401 | 9/1993 | Umemoto et al. | 360/10.3 X |
| 5,255,126 | 10/1993 | Matsuzawa et al. | 360/67 X |
| 5,319,499 | 6/1994 | Kim et al. | 360/10.1 |
| 5,361,174 | 11/1994 | Seki et al. | 360/65 X |
| 5,404,250 | 4/1995 | Hase et al. | 360/51 |
| 5,436,771 | 7/1995 | Yun | 360/65 |

*Primary Examiner*—W. Chris Kim
*Attorney, Agent, or Firm*—Sughrue, Mion, Zinn, Macpeak & Seas

[57] ABSTRACT

A variable speed reproducing apparatus for a digital videocassette recorder which outputs data having an improved C/N ratio. A gate buffer receives a reproduction signal which has been amplified by a pre-amplifier and outputs only that portion of the reproduction signal which has an amplitude greater than a predetermined amount. A reproducer receives the reproduction signal which has been conditioned by a reproduction equalizer and applies the reproduced signal to a synchronizer. The synchronizer outputs reproduced data according to a clock signal produced by a phase-locked loop circuit in accordance with speed data received from a servo.

4 Claims, 3 Drawing Sheets

VARIABLE SPEED REPRODUCING APPARATUS FOR A DIGITAL VIDEO CASSETTE RECORDER

BACKGROUND OF THE INVENTION

The present invention relates to a variable speed reproducing apparatus for a digital video cassette recorder, and more particularly, to an apparatus which prevents data detection errors and improves synchronization performance, by removing outputs having an amplitude level less than or equal to a predetermined level from reproduction signals.

In a conventional digital videocassette recorder in which reproduction is performed at variable speeds, since either a simple AGC amplifier is used or a reproduced output is used without amplification, a portion of the reproduction signal sent to a data detector has a low carrier-to-noise (C/N) ratio and accordingly causes errors to be generated. The resultant unstable operation of a phase-locked loop (PLL) increases the bit error rate. Also, since the low C/N ratio portion is included in the output of an equalizer, error generation is further increased so that unreliable data is output therefrom, which destabilizes PLL operation at the time of data detection. As a result, the bit error rate of variable speed reproduction is high, thereby lowering system performance.

That is, when reproducing in a digital videocassette recorder as above, since the amplitude of the reproduction signal is below a predetermined level, portions of the amplified reproduction signal have a poor C/N ratio and coexist with portions having higher C/N ratios. The low-amplitude portion raises the probability of error generation at the time of data detection and lowers the synchronization performance of the PLL circuit.

A conventional variable speed magnetic recording and reproducing apparatus is disclosed in U.S. Pat. No. 4,930,024. This apparatus includes a variable speed rotary head, a variable speed disk drive and a circuit for controlling the speed of the rotary head according to the change of speed of the variable speed disk drive, and can lower noise generated during reproducing. However, according to this apparatus, a selective output according to a level of the reproduced output cannot be accomplished.

SUMMARY OF THE INVENTION

To solve the aforementioned problems, it is an object of the present invention to provide a variable speed reproducing apparatus for a digital videocassette recorder having an improved bit error rate and improved synchronization performance, by removing outputs of variable reproduction signals having an amplitude equal to or less than a predetermined level and outputting only the reproduction signal having an amplitude higher than the predetermined level.

To accomplish the above object, in a variable speed reproducing apparatus for a digital videocassette recorder which reads a signal recorded on a tape via a head, amplifies the read signal and reproduces an amplified reproduction signal as data, depending on variable speeds, the apparatus according to the present invention includes:

variable speed reproduction controlling means for receiving speed data and generating a gate signal and a PLL control signal;

gate buffering means for receiving the reproduction signal and removing the signal having an amplitude of a predetermined level or below, depending on the gate signal;

reproduction equalizing means for receiving the output of the gate buffering means and correcting the phase and amplitude thereof;

data reproducing means for receiving the output of the reproduction equalizing means and detecting data;

a phase-locked loop for receiving the output of the data reproducing means and generating a clock, depending on the PLL control signal; and synchronizing means for synchronizing the data with the clock and outputting the synchronized data.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
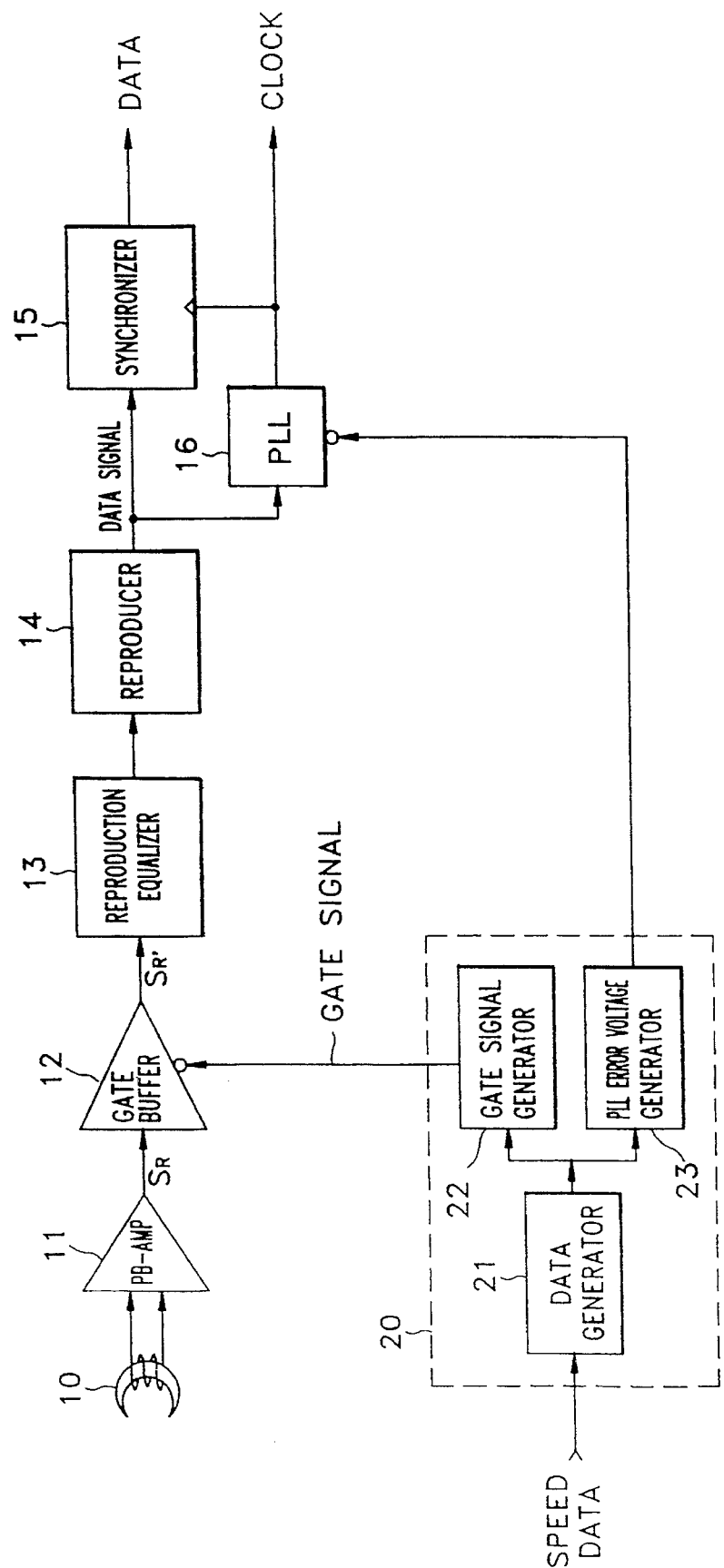
FIG. 1 is a block diagram of the variable speed reproducing apparatus according to an embodiment of the present invention.

In FIG. 1, the variable speed reproducing apparatus according to an embodiment of the present invention includes a head 10, a playback pre-amplifier (PB-AMP) 11, a gate buffer 12, a reproduction equalizer 13, a reproducer 14, a synchronizer 15, a phase-locked loop (PLL) circuit 16, and a variable speed reproduction controller 20. Head 10 reproduces data recorded on a recording medium such as magnetic tape and outputs the reproduced data to playback pre-amplifier 11. Playback pre-amplifier 11 amplifies a reproduction signal and applies the amplified signal to gate buffer 12 which outputs only the portion of the output of playback pre-amplifier 11 which is above a predetermined level, in accordance with an output of variable speed reproduction controller 20. Reproduction equalizer 13 receives the output of gate buffer 12 and compensates the same so as to be suitable for channel characteristics, thereby preventing interference between signals. The output of reproduction equalizer 13 is detected as data in reproducer 14, is synchronized with a reproduction clock in synchronizer 15, and then is output as data. The output of reproducer 14 is input to PLL circuit 16 to then generate a reproduction clock, which is output to synchronizer 15 and other parts of the system. Also, PLL circuit 16 generates a reproduction clock depending on outputs of variable speed reproduction controller 20. Variable speed reproduction controller 20 receives speed data and outputs control signals to gate buffer 12 and PLL circuit 16.

Figure 2:
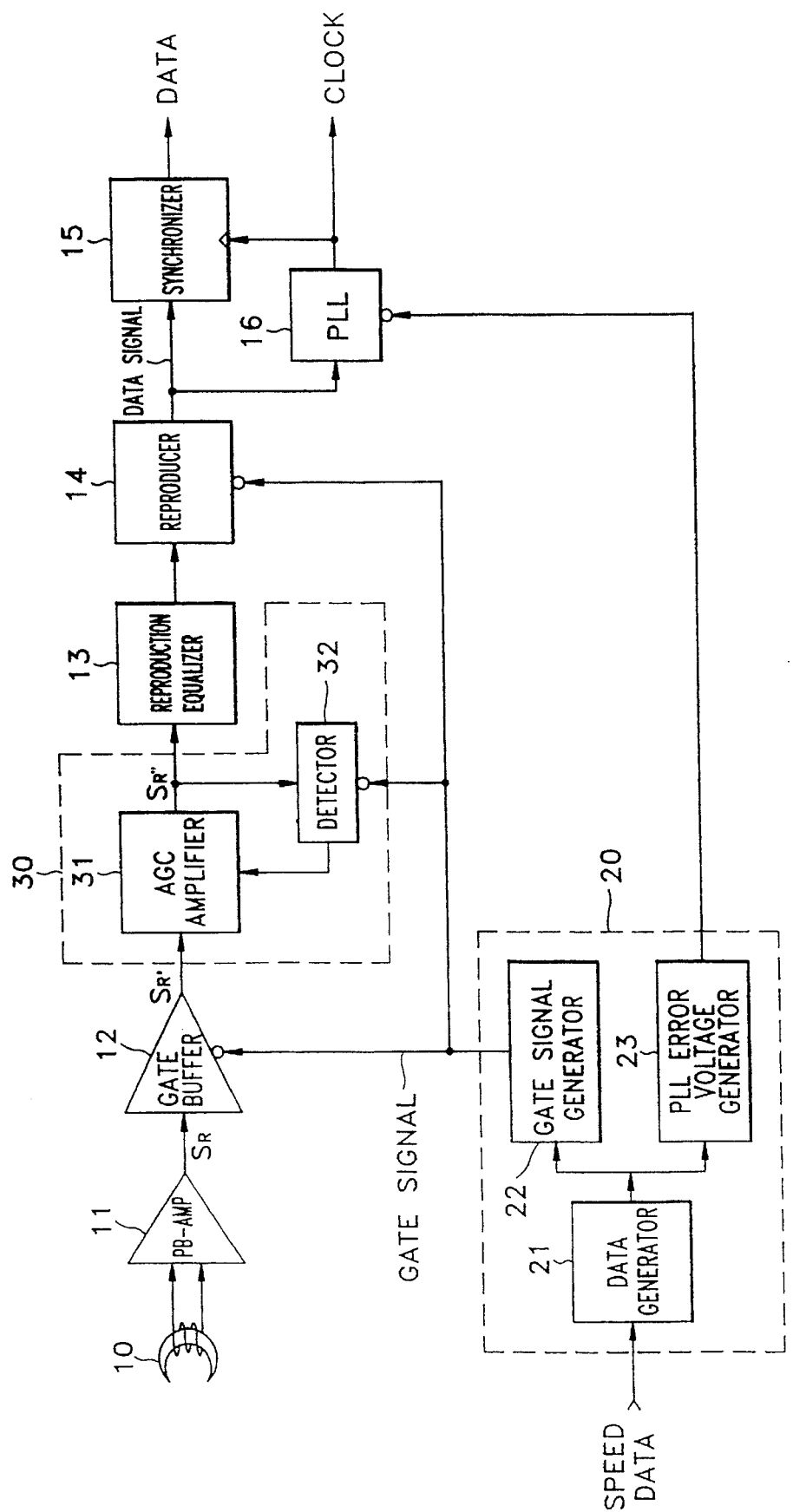
FIG. 2 is a block diagram of the variable speed reproducing apparatus according to another embodiment of the present invention.

FIG. 2 is a block diagram of a variable speed reproducing apparatus according to another embodiment of the present invention. The variable speed reproducing apparatus includes a head 10, a playback amplifier (PB-AMP) 11, a gate buffer 12, an automatic gain control amplifying unit 30, a reproduction equalizer 13, a reproducer 14, a synchronizer 15, a phase-locked loop (PLL) 16 and a variable speed reproduction controller 20. In comparison to the apparatus of FIG. 1, the apparatus according to this embodiment further includes automatic gain control amplifying unit 30. Automatic gain control amplifying unit 30 is constituted by an automatic gain control amplifier (AGC AMP) 31 for amplifying the output of gate buffer 12 according to an automatic gain control signal, and a detector 32 for generating the automatic gain control signal according to a gate signal by receiving the output of automatic gain control amplifier 31. Also, variable speed reproduction controller 20 is constituted by a data generator 21, a gate signal generator 22 and a PLL error voltage generator 23.

In FIG. 2, head 10 reproduces data recorded onto a recording medium and outputs the reproduced data to playback pre-amplifier 11. Playback pre-amplifier 11 amplifies a reproduction signal $S_R$ read out by head 10. Gate buffer 12 outputs the reproduction signal $S_R'$ having an amplitude higher than a predetermined level among the outputs of playback pre-amplifier 11 to AGC amplifier 31 and removes that portion of the reproduction signal $S_R$ having an amplitude lower than a predetermined level, depending on the outputs of gate signal generator 22. That is to say, the portions of the reproduction signal $S_R$ which have a poor C/N ratio due to a very low level of amplitude and which are output by the playback pre-amplifier 11 are not output by gate buffer 12. Since the low-amplitude portion of the signal has a high probability of generating errors at data detection, it is removed by gate buffer 12 in the present invention. AGC amplifier 31 performs an AGC-detection and amplifies the signal of FIG. 3D to an amplitude advantageous for data detection. At this time, the signal $S_R''$ amplified in AGC amplifier 31 is detected in detector 32 according to the gate signal to then be fed back to AGC amplifier 31. Reproduction equalizer 13 performs phase and amplitude correction and reproducer 14 detects data output by reproduction equalizer 13. PLL 16 receives a data signal output from reproducer 14 and generates a clock depending on an output (a PLL control signal) of PLL error voltage generator 23.

Synchronizer 15 synchronizes data output by reproducer 14 with the clock generated by PLL 16 and outputs the synchronized data. Variable speed reproduction controller 20 converts speed data input from a servo (not shown) into four-bit data which can express all possible variable speeds and generates a PLL control signal and a gate signal.

That is to say, data generator 21 receives speed data and generates four-bit variable speed discrimination data. PLL error voltage generator 23 outputs to PLL circuit 16 a PLL control signal which has a characteristic DC voltage which depends on the variable speed discrimination data, so as to generate a clock suitable for the corresponding variable speed. Gate signal generator 22 receives four-bit discrimination data, frequency-divides a head switching signal appropriately, generates a characteristic gate signal suitable for each variable speed and outputs the generated signal to gate buffer 12, detector 32 and reproducer 14, respectively.

Figure 3A:
FIGS. 3A to 3G are operational waveform diagrams of various signals present at points throughout the variable speed reproducing apparatus of FIG. 2.
Figure 3B:
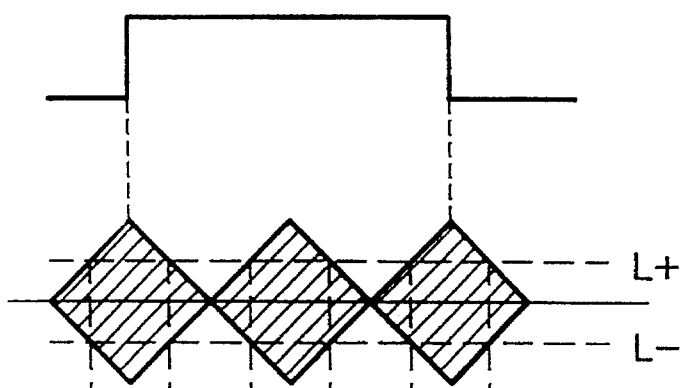
Figure 3C:
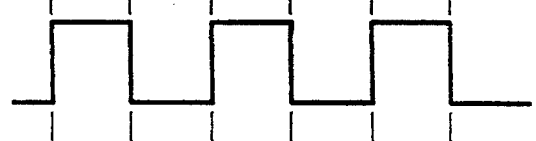
Figure 3D:
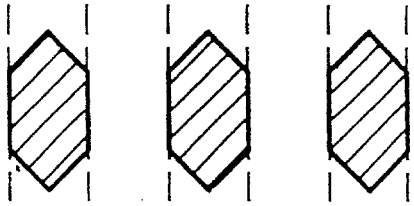
Figure 3E:
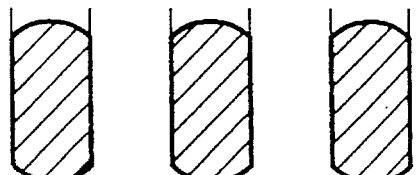
Figure 3F:
Figure 3G:
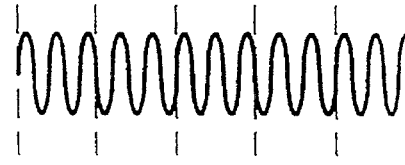

FIGS. 3A–3G are operational waveform diagrams of various signals present at points throughout the variable speed reproducing apparatus of FIG. 2. Specifically, FIG. 3A is a waveform diagram showing a head switching signal. FIG. 3B is a waveform diagram showing a reproduction signal $S_R$ which is an output of the playback pre-amplifier shown in FIG. 1, where dotted lines represent predetermined levels L+ and L−. FIG. 3C is a waveform diagram showing a gate signal shown in FIGS. 1 and 2. FIG. 3D is a waveform diagram showing a gated reproduction signal $S_R'$ which is an output of gate buffer 12 shown in FIGS. 1 and 2, where the reproduction signal $S_R$ is amplified and is then output if the gate signal is high, and is not output if the gate signal is low. FIG. 3E is a waveform diagram showing an AGC-amplified reproduction signal $S_R''$ which is an output of AGC amplifier 31 shown in FIG. 2, where the gated reproduction signal $S_R'$ is amplified to have an amplitude advantageous for data detection. FIG. 3F shows a data signal detected in data reproducer 14 shown in FIGS. 1 and 2. FIG. 3G shows a clock signal which is an output of PLL circuit 16 shown in FIGS. 1 and 2.

As described above, the present invention relates to a variable speed reproduction system which uses less hardware and is made stable by virtue of a lower error rate and improved synchronization performance.

What is claimed is:

1. A variable speed reproducing apparatus for a digital videocassette recorder which reads a signal recorded on a tape via a head, amplifies the read signal and reproduces an amplified reproduction signal into data, according to variable speeds, said apparatus comprising:

variable speed reproduction controlling means for receiving speed data and generating a gate signal and a PLL control signal in response to said speed data;

gate buffering means for receiving said reproduction signal and removing portions of the received signal which have an amplitude lower than a predetermined level and outputting a resultant signal in accordance with said gate signal;

reproduction equalizing means for receiving the resultant signal output by said gate buffering means and correcting a phase and amplitude thereof and thereby generating an output;

data reproducing means for receiving the output of said reproduction equalizing means and detecting data therefrom;

a phase-locked loop for receiving the output of said data reproducing means and generating a clock in accordance with the PLL control signal; and synchronizing means for synchronizing said data with said clock and outputting the synchronized data.

2. A variable speed reproducing apparatus for a digital videocassette recorder as claimed in claim 1 wherein said variable speed reproduction controlling means includes a data generator for generating variable speed discrimination data in accordance with said speed data, a gate signal generator for generating a gate signal depending on said variable speed discrimination data, and a PLL error voltage generator for generating a PLL error voltage depending on said variable speed discrimination data.

3. A variable speed reproducing apparatus for a digital videocassette recorder which reads a signal recorded on a tape onto a head, amplifies the read signal and reproduces an amplified reproduction signal into data according to variable speeds, said apparatus comprising:

variable speed reproduction controlling means for receiving speed data and generating a gate signal and a PLL control signal in response to said speed data;

gate buffering means for receiving said reproduction signal and removing portions of the received signal which have an amplitude lower than a predetermined level and outputting a resultant signal in accordance with said gate signal;

an automatic gain control amplifying means for receiving the output of said gate buffering means and amplifying the output of said gate buffering means in accordance with said gate signal to produce an output;

reproduction equalizing means for receiving the output of said automatic gain control amplifying means and correcting a phase and amplitude thereof and generating a resulting output;

data reproducing means for receiving the output of said reproduction equalizing means and detecting data therefrom and generating a resulting output;

a phase-locked loop for receiving the output of said data reproducing means and generating a clock in accordance with the PLL control signal; and synchronizing means for synchronizing said data with said clock and outputting the synchronized data.

4. A variable speed reproducing apparatus for a digital videocassette recorder as claimed in claim 3 wherein said automatic gain control amplifying means includes an automatic gain control amplifier for amplifying the output of said gate buffering means according to an automatic gain control signal and a detector for receiving the output of said automatic gain control amplifier and generating said automatic gain control signal in accordance with said gate signal.

* * * * *